United States Patent [19]

Horbaschek

[11] Patent Number: 5,048,067

[45] Date of Patent: Sep. 10, 1991

[54] X-RAY DIAGNOSTICS INSTALLATION

[75] Inventor: Heinz Horbaschek, Erlangen, Fed. Rep. of Germany

[73] Assignee: Siemens Aktiengesellschaft, Munich Germany

[21] Appl. No.: 558,469

[22] Filed: Jul. 27, 1990

[30] Foreign Application Priority Data

Aug. 3, 1989 [EP] European Pat. Off. ........ 89114380.2

[51] Int. Cl.⁵ .............................................. H05G 1/64
[52] U.S. Cl. ..................................... 378/99; 378/156
[58] Field of Search .................... 378/99, 156; 358/111

[56] References Cited

U.S. PATENT DOCUMENTS 4,672,652 6/1987 Huttenrauch et al. .............. 378/148

FOREIGN PATENT DOCUMENTS

WO8404878 of 0000 PCT Int'l Appl. .

Primary Examiner—Craig E. Church
Attorney, Agent, or Firm—Hill, Van Santen, Steadman & Simpson

[57] ABSTRACT

An x-ray diagnostics installation has an x-ray source fed by a high voltage supply, an x-ray image intensifier video chain for generating stored video signals of an exposure without a patient present in the x-ray beam, and a calculating stage connected to the memories. A filter is disposed in the path of the x-ray beam. The calculating stage is connected to the video chain and to the high voltage supply and calculates actual attenuation values of an x-ray exposure with the filter inserted in the x-ray beam.

9 Claims, 1 Drawing Sheet

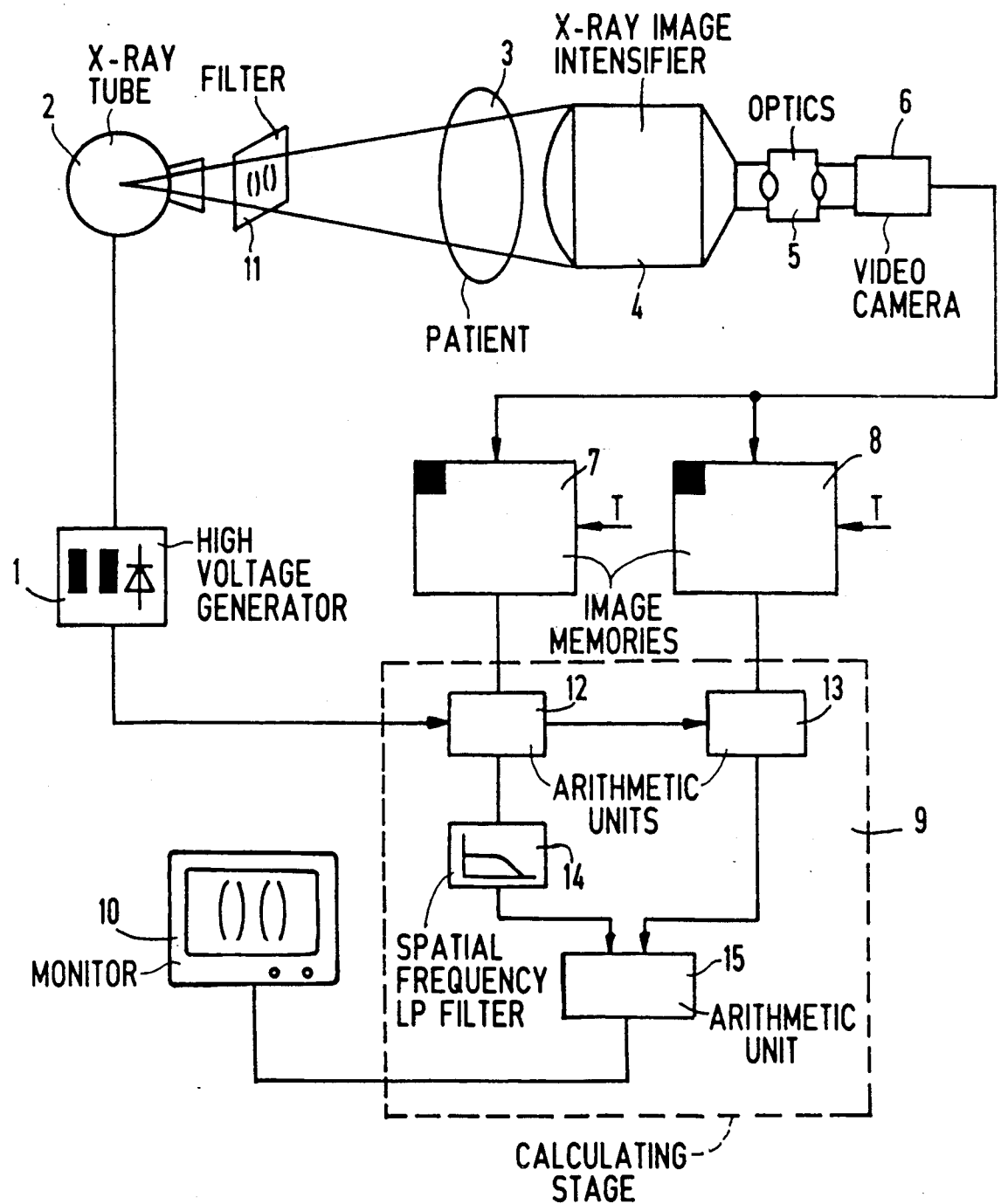

X-RAY DIAGNOSTICS INSTALLATION

BACKGROUND OF THE INVENTION

1. Field of the Invention

The present invention is directed to an x-ray diagnostics installation of the type having an x-ray source fed by a high voltage supply, an x-ray image intensifier video chain for generating video signals without a patient present in the x-ray beam, means for storing the video signals, and a calculating stage.

2. Description of the Prior Art

X-ray diagnostics installations are known in the art which permit video signals to be obtained and stored without a patient present in the x-ray beam, i.e. for generating an x-ray exposure without useful medical information. Installations of this type permit image artifacts, which may arise due to disturbances created in the x-ray image intensifier video chain, to be eliminated or minimized.

Such an installation is described in German OS No. 31 39 331. In this known installation, before beginning an exposure or transillumination of a patient, the x-ray tube is briefly activated and the x-ray image intensifier is illuminated without a patient present in the x-ray beam, so that no useful medical information is present on the input luminescent screen. The output image of the x-ray image intensifier which may, for example, contain artifacts due to irregularities in the phosphor layer, is picked-up by a video camera, and is entered into an image memory. In a subsequent exposure or transillumination in which the patient is present in the x-ray beam, the stored image is subtracted from the current patient image, and the artifacts are thereby compensated. This installation, however, permits only artifacts arising from the x-ray image intensifier video chain to be compensated.

In the transillumination of a subject with x-rays, a lower quantum signal-to-noise ratio can be expected in the image at locations corresponding to dense regions of the subject than at image locations corresponding to regions of the subject having lower density. This is a result of the known radiation attenuation law. Additionally, deterioration of the signal-to-noise ratio can be expected in dense regions due to the noise component of stray radiation.

German OS No. 35 00 812, corresponding to the U.S. Pat. No. 4,672,652, discloses an x-ray diagnostics installation wherein a semi-transparent diaphragm is used as an x-ray filter which is adapted to the examination subject, which leaves the desired, dense subject zones substantially free of attenuation, and greatly attenuates the image brightness of the transparent region by filtering. As a result, the demands made on the dynamics of the receiver system are reduced. A disadvantage of this approach, however, is that the natural attenuation difference which is present in the examination subject is diminished, and may no longer be recognizable, in the x-ray image. In evaluating lung exposures, for example, the diminishing of the attenuation difference has a significant negative influence on the utility of the image for diagnostic purposes. Moreover, image artifacts frequently occur in the image in this known system, because it is not possible in practice to precisely adapt the filtering to the subject.

SUMMARY OF THE INVENTION

It is an object of the present invention to provide an x-ray diagnostics installation which undertakes a differential attenuation of the radiation intensity by filtering the x-ray beam prior to the x-ray beam being incident on the examination subject, and wherein the actual attenuation value is calculated.

The above object is achieved in accordance with the principles of the present invention in an x-ray diagnostics installation having a filter allocated to the x-ray source, and having a calculating stage connected to the video chain and to the high voltage generator so that the actual attenuation values of the x-ray exposure, with the filter inserted in the x-ray beam, can be calculated. As a result, the filter can reduce the transparency differences which are normally present in the subject, so that a uniform quantum signal-to-noise ratio is achieved. Subsequently, the normal brightness values corresponding to the anatomy of the subject are made identifiable by the calculating stage, so that a normal x-ray exposure appears on the display, with the reduction in image contrast occurring as a result of the filtering no longer being present.

In a preferred embodiment, the filter is a graduated filter, that is, a filter having differing attenuation over its area, so that x-rays are more highly attenuated in some regions of the filter than in others. An exact reconstruction of the x-ray image can be achieved in an embodiment wherein the calculating stage calculates the actual, absolute attenuation values pixel-by-pixel on the basis of the KV values supplied by the high voltage generator, and on the basis of the material comprising the filter.

A simple arrangement is achieved in an embodiment wherein the calculating stage calculates the attenuation values pixel-by-pixel on the basis of attenuation coefficients. The first attenuation coefficients can be calculated in a first arithmetic unit connected to the high voltage generator and to a memory for reference exposure values. As used herein, a "reference exposure" is an exposure made without a patient present in the x-ray beam. Second attenuation coefficients can be calculated pixel-by-pixel from the attenuation values of the useful exposure in a second arithmetic unit connected to the high voltage generator and to a memory for useful exposure values. As used herein, "useful exposure" means an exposure wherein the patient is present in the x-ray beam and medically relevant information is obtained in the resulting x-ray exposure.

Fast processing is enabled by the inclusion in the calculating stage of a third arithmetic unit, which calculates an image including the actual attenuation values which would correspond to the subject image without the filter being present. Calculating is done in the third arithmetic unit from the attenuation coefficients supplied by the first and second arithmetic units. Deterioration of the signal-to-noise ratio for high spatial frequencies is avoided by the inclusion of a spatial frequency low pass filter in the calculating stage.

DESCRIPTION OF THE DRAWING

FIG. 1 is a schematic block diagram of an x-ray diagnostics installation constructed in accordance with the principles of the present invention.

DESCRIPTION OF THE PREFERRED EMBODIMENTS

In the exemplary embodiment shown in the drawing, an x-ray diagnostics installation constructed in accordance with the principles of the present invention is shown including a high voltage generator 1 which feeds an x-ray tube 2 which emits an x-ray beam that penetrates a patient 3. The attenuated radiation is incident on the input luminescent screen of an x-ray image intensifier 4. A video camera 6 is coupled via optics 5 to the output luminescent screen of the x-ray image intensifier 4. The output signal of the video camera 6 is supplied to two image memories 7 and 8, contained in an image processing circuit, the remainder of which is known and is not shown in detail. The image memories 7 and 8 are connected to a monitor 10 via a calculating stage 9.

A filter which filters the x-rays prior to the x-rays being incident on the patient 3 is disposed in the x-ray beam of the x-ray tube 2. The filter 11 may, for example, be a lung graduated filter or a filter matrix having differing attenuation over its area, so that the x-rays are more highly attenuated in the region of the lung, for example, than in the other regions.

A reference or "dummy" image is obtained and entered into the first image memory 7. At the radiation hardness which has been set, this image contains information as to the manner by which the filter 11 acts on the image. An image with the patient 3 present in the x-ray beam is entered in the second image memory 8, so that the attenuation values of the patient 3 and the filter 11 are contained in the second image memory 8.

The calculating stage 9 includes two arithmetic units 12 and 13 respectively connected to the outputs of the image memories 7 and 8. The first arithmetic unit 12 is also connected to the high voltage generator 1, from which the KV values and, for example, values which characterize the material of the filter 11, are supplied to the first arithmetic unit 12. As a result of the known KV value in the exposure and the material of the filter 11, data for the absolute attenuation value of each individual pixel can be calculated and stored for the reference image.

In the subsequent exposure with the patient 3 in the x-ray beam, the attenuation coefficients for all pixels can be calculated in the second arithmetic unit 13, likewise given knowledge of the KV values and of the material of the filter 11. The second arithmetic unit 13 is for this purpose also connected to the high voltage generator 1, via the first arithmetic unit 12.

Using the attenuation coefficients identified in the first and second arithmetic units 12 and 13, an image is calculated in a third arithmetic unit 15 which corresponds to the subject image without additional attenuation by the filter 11. This image thus consists of the actual, absolute attenuation values. This image can then be displayed on the monitor 10.

Because the filter 11 contains no large contrast discontinuities, the correction signal can be supplied to a spatial frequency low pass filter 14, so that the signal-to-noise ratio for high spatial frequencies is not deteriorated.

The apparatus can also be used in a transillumination mode, in which case the output signal of the video camera 6 having the useful information, i.e. the image of the patient 3, is directly supplied to the second arithmetic unit 13 without intermediate storage, so that an immediate calculation of the attenuation coefficients, and of the actual attenuation values, can ensue.

Although modifications and changes may be suggested by those skilled in the art, it is the intention of the inventor to embody within the patent warranted hereon all changes and modifications as reasonably and properly come within the scope of his contribution to the art.

I claim as my invention:

1. An x-ray diagnostics installation comprising:
   an x-ray source fed by a high voltage generator for generating an x-ray beam;
   an x-ray image intensifier video chain including first memory means for storing video signals of an x-ray image without a subject present in the x-ray beam and second memory means for storing video signals of an x-ray image with a subject disposed in the x-ray beam;
   filter means for filtering said x-ray beam; and
   calculating means connected to said first and second memories and to said high voltage generator for calculating, with said means for filtering present in the x-ray beam, actual attenuation values of an x-ray exposure which would be obtained without the means for filtering present in the x-ray beam.

2. An x-ray diagnostics installation as claimed in claim 1 wherein said means for filtering is disposed for filtering said x-ray beam prior to the x-ray beam being incident on a subject.

3. An x-ray diagnostic installation as claimed in claim 1, wherein said means for filtering is a filter having differing attenuation regions over its area.

4. An x-ray diagnostics installation as claimed in claim 1 wherein said calculating means includes means for calculating said actual attenuation values pixel-by-pixel on the basis of KV values supplied by said high voltage generator and on the basis of the material of said means for filtering.

5. An x-ray diagnostics installations as claimed in claim 1 wherein said calculating means includes means for calculating said attenuation values pixel-by-pixel on the basis of attenuation coefficients.

6. An x-ray diagnostics installation as claimed in claim 1 wherein said calculating means includes a first arithmetic means connected to said high voltage generator and to the said first memory for calculating first attenuation coefficients for said image without a subject present in the x-ray beam.

7. An x-ray diagnostics installation as claimed in claim 6 wherein said calculating means further includes second arithmetic means connected to said high voltage generator and to said second memory for calculating second attenuation coefficients for the image obtained with a subject disposed in the x-ray beam.

8. An x-ray diagnostics installation as claimed in claim 7, wherein said calculating stage further includes third arithmetic means connected to said first and second arithmetic means, for calculating, from the attenuation coefficients supplied by said first and second arithmetic means, said actual attenuation values which would be obtained without the means for filtering present in the x-ray beam.

9. An x-ray diagnostics installation as claimed in claim 1 wherein said calculating means includes a spatial frequency low pass filter means for preventing deterioration of the signal-to-noise ratio for high spatial frequencies.

* * * * *